Dec. 30, 1952  J. MINDEL  2,623,303
EDUCATIONAL TOY
Filed June 13, 1949
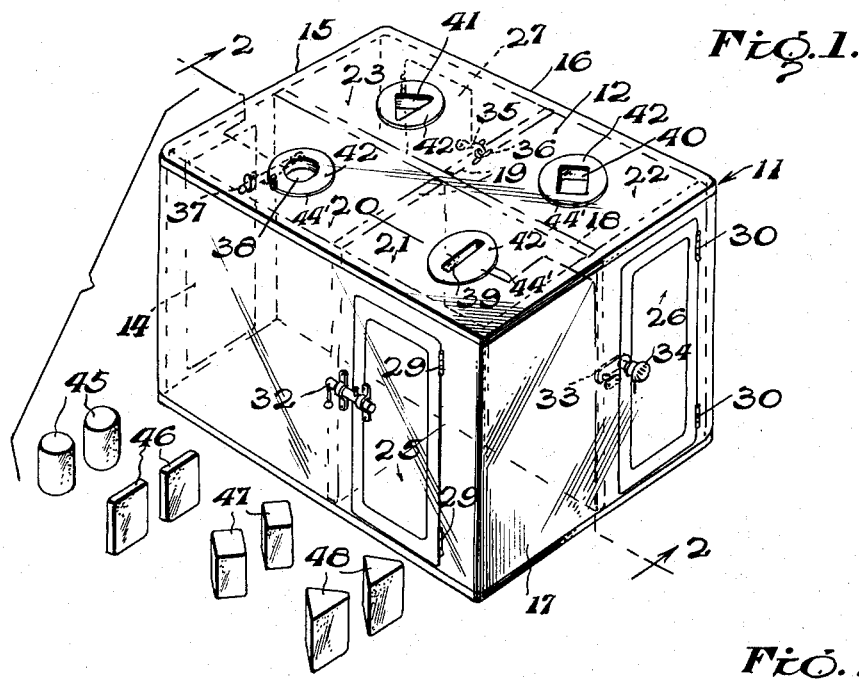
Fig. 1.
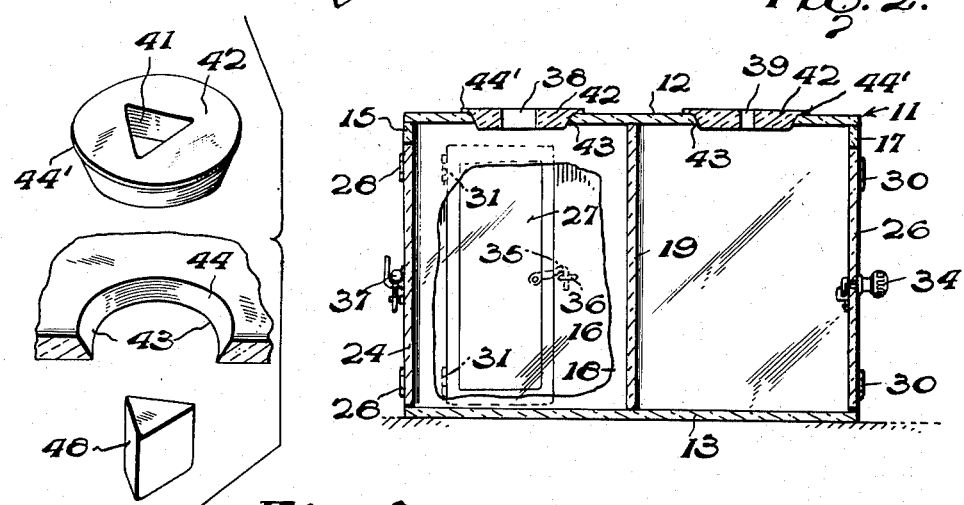
Fig. 2.
Fig. 3.
INVENTOR.
Joseph Mindel.
BY
Albert J. Kramer
ATTORNEY Patented Dec. 30, 1952

2,623,303

UNITED STATES PATENT OFFICE 2,623,303

EDUCATIONAL TOY

Joseph Mindel, New York, N. Y., assignor, by direct and mesne assignments, of one-half to Jeanette Goor and one-half to Albert J. Kramer, both of Arlington, Va.

Application June 13, 1949, Serial No. 98,813

3 Claims. (Cl. 35—22)

This invention relates to toys and is more particularly concerned with educational toys for teaching children the rudiments of classification.

One of the objects of the invention is the provision of a toy of the type mentioned which comprises a plurality of different shaped objects and a plurality of compartments for selectively receiving said objects so that a child may learn not only the procedure of classification, but also the results obtained by proper classification. The latter element is an especially important feature of the invention because it provides an objective lesson in the value of classification.

Another object of the invention is the provision of means for changing the geometrical characters which may be employed in using the toy.

A further object of the invention is the provision of means for gaining access to the interior of the individual compartments each of which requires a different manipulation, thereby to emphasize the differences among the classification compartments.

A still further object of the invention is the provision of a toy of the type mentioned which is simple and inexpensive to manufacture, which can be readily carried by a small child, which is not dangerous to handle and which is not likely to cause injury to small children.

These and other objects and advantages of the invention will be apparent from the following description considered together with the accompanying drawing, in which drawing:

Fig. 1 is an isometric view of one embodiment of the invention, including the geometrically shaped blocks that form a part of the embodiment.

Fig. 2 is a longitudinal cross section along the line 2—2 of Fig. 1.

Fig. 3 is a fragmentary exploded isometric view of the top of one of the compartments of the embodiment illustrating the use of the various parts thereof.

Referring with more particularity to the drawing in which like numerals designate like parts, the embodiment illustrated comprises a box-like receptacle 11, having a top 12, bottom 13, and sides 14, 15, 16 and 17. The interior of this receptacle is divided into a plurality of compartments by partitions 18 and 19, such as compartments 20, 21, 22 and 23. Each compartment is provided with an exterior door 24, 25, 26 and 27, respectively, mounted on hinges 28, 29, 30 and 31, respectively. Each door is also provided with latch means, there being preferably a different latch means for each door. For example, the drawing illustrates a sliding bolt 32 for the door 25, operated by reciprocation of the bolt; a notched bar and pin latch 33 for the door 26, operated by turning the bar handle 34; a hook and eye latch for the door 27 operated by manipulating the hook 35 in and out of the eye 36; and a thumb latch 37 for the door 24. Other types of latches may be used, the types shown in the drawing being for illustrative purposes only.

Over each compartment the top 12 is provided with a geometrical aperture, such as a circular aperture 38 for the compartment 20, a rectangular aperture 39 for the compartment 21, a square aperture 40 for the compartment 22 and a triangular aperture 41 for the compartment 23. Other geometrical shapes, such as elliptical, trapezoidal, cardioidal, etc., or combinations of any two or more regular or irregular shapes may be used, the shapes shown in the drawing being merely by way of illustration and not by way of limitation.

In order to permit changing the shape of the apertures of the compartments, they are preferably provided in removable pieces 42 which fit into a larger aperture 43. The latter aperture is of a size common to all the receptacles, so that the pieces 42 may be interchanged among themselves or different members carrying different shaped apertures substituted therefor. The sides of each of the pieces 42 are preferably tapered downwardly to fit onto a complementary annular seat 44 about the apertures 43. The pieces 42 may also be provided with an outwardly extending rim 44' to facilitate their removal and replacement.

A plurality of different geometrical pieces or blocks such as the cylindrical blocks 45, the rectangular blocks 46, the cubical blocks 47 and the triangular blocks 48, are provided for insertion through the correspondingly shaped apertures 38, 39, 40 and 41. The blocks are preferably of a size and shape such that they will slip through only the correspondingly shaped apertures. The child in playing with the toy will thereby be compelled to insert the proper blocks through the proper apertures. When all the pieces have been inserted, the child, in order to recover the blocks, is compelled to open the doors whereupon he discovers the blocks sorted in accordance with their geometrical shapes. In other words, each compartment will contain only the blocks of one geometrical shape. In opening the doors, the child will also be required to manipulate the latches. Since each latch is distinct from the others, a mental association indicating that there are differences among the various compartments will be established, at the same time the child will learn the manner of opening and closing different types of latches.

Various modifications of the invention may be made. For example, the top over each compartment or the insert pieces 42 thereof may be painted a different color corresponding to the blocks to teach the child color identity. This may be made more difficult by having all the holes of the same geometrical pattern differing among themselves only in color. Instead of using colors, pictures of animals or objects may be used.

Having thus described my invention, I claim:

1. An educational toy comprising a plurality of compartments, means for gaining access to the interior of each compartment, each compartment having an aperture therethrough and a member adapted to be removably disposed in said aperture, each of said members having an aperture therethrough of distinctive shape relative to the apertures of the other members, and blocks of correspondingly distinctive shapes for insertion through said last mentioned apertures.

2. An educational toy as defined by claim 1 in which the members are provided with a flanged rim.

3. An educational toy as defined by claim 1 in which the members are provided with tapered sides and the apertures into which they fit are provided with seats to receive said tapered sides.

JOSEPH MINDEL.

REFERENCES CITED

The following references are of record in the file of this patent:

UNITED STATES PATENTS

| Number | Name | Date |
|---|---|---|
| 741,903 | Gates | Oct. 20, 1903 |
| 2,416,959 | Segal | Mar. 4, 1947 |

OTHER REFERENCES

"Psychological and Physiological Apparatus and Supplies," catalogue of the C. H. Stoelting Co., 424 North Homan Ave., Chicago, Ill., pages 61 and 147; received in Patent Office August 6, 1930.